March 23, 1926.
W. C. CARR
INDUSTRIAL TRUCK
Filed Feb. 9, 1922    2 Sheets-Sheet 1
1,577,894
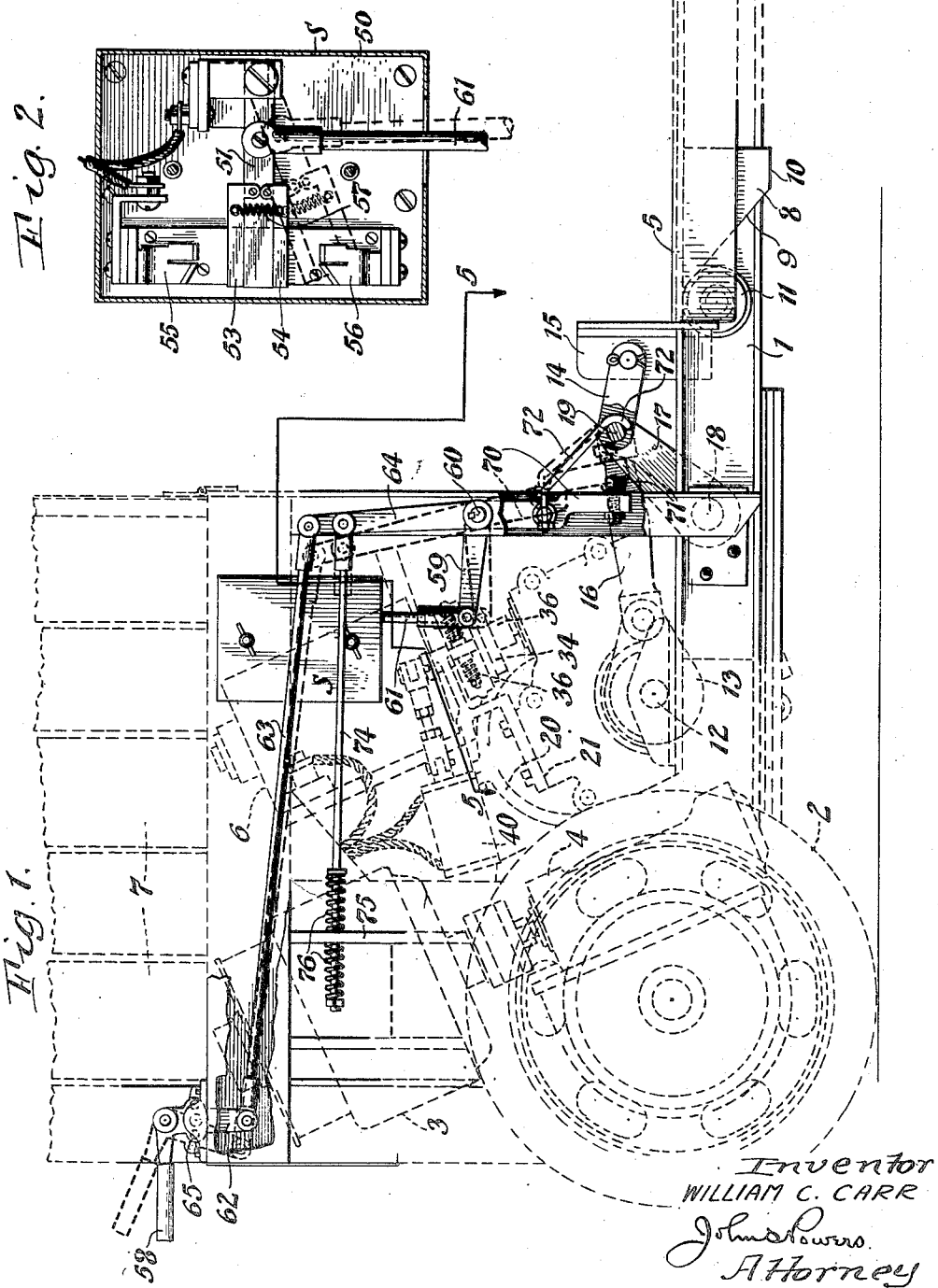
Inventor
WILLIAM C. CARR

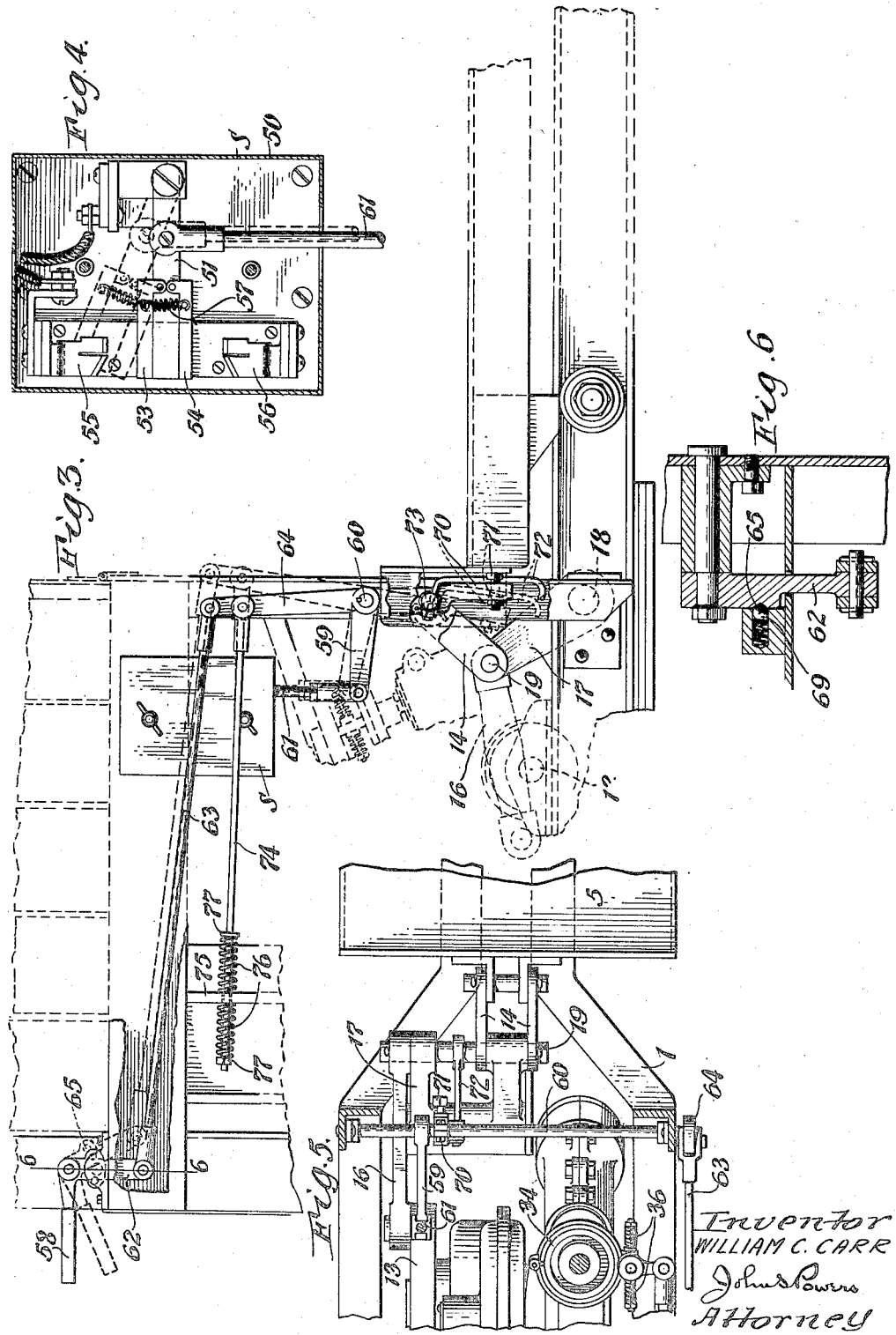

Patented Mar. 23, 1926.

1,577,894

UNITED STATES PATENT OFFICE.

WILLIAM C. CARR, OF BUFFALO, NEW YORK, ASSIGNOR TO THE AUTOMATIC TRANSPORTATION COMPANY, OF BUFFALO, NEW YORK, A CORPORATION OF ARIZONA.

INDUSTRIAL TRUCK.

Application filed February 9, 1922. Serial No. 535,246.

*To all whom it may concern:*

Be it known that I, WILLIAM C. CARR, a citizen of the United States, residing at Buffalo, in the county of Erie and State of New York, have invented certain new and useful Improvements in Industrial Trucks, of which the following is a specification.

This invention relates to improvements in motor-driven industrial trucks of the type wherein a lifting platform is provided for picking up or depositing the loaded skid.

The invention relates more particularly to improvements in the mechanism for operating the switch of the electric motor by which, through intermediate agencies, the movements of the lifting platform are effected.

The principal object is to provide simply constructed mechanism which will insure the facile manual control of said switch and its certain operation to cut off the current upon the completion of the movement of the lifting platform in either direction.

The invention consists generally in certain novel features of structure and arrangement by which the switch is manually controlled and also is made directly and positively responsive in action to the platform at the completion of its movement in either direction.

In the accompanying drawings:

Figure 1 is a side elevation of an industrial truck in which the features of the invention are incorporated, the platform being in its lower position.

Figure 2 is a detail view of the switch showing in broken lines the position of the switch arm for the upward movement of the platform.

Figure 3 is a partial side elevation of the truck, the platform being in elevated position.

Figure 4 is a detail view of the switch showing in broken lines the position of the switch arm for the downward movement of the platform.

Figure 5 is a section on the line 5—5 of Figure 1.

Figure 6 is a section on the line 6—6 of Figure 3.

In Figure 1 the switch mechanism in which the invention is embodied and certain co-operating elements are shown in full lines and are thereby distinguished from other features of the truck which are shown in broken lines.

The truck includes a frame 1 supported by front and rear wheels (whereof only the rear wheels 2 are shown), a propelling motor 3 connected by suitable gearing 4 to the rear wheels, a lifting platform 5, a motor 6 for the operation of said platform, and storage batteries 7 as the source of current for the operation of the motors 3 and 6. The batteries 7 may be conveniently supported above the motors and their associated gear trains and the platform 5 is, of course, arranged in front of the motors and above the frame 1. The platform 5 is directed rearward and upward or forward and downward by suitable means, preferably consisting of raising blocks 8 secured to the under face of the platform and having inclined bearing edges 9 terminating at their lower ends in flat, horizontal bearing surfaces 10, said blocks co-operating with rollers 11 having suitable fixed bearings in parts of the frame 1. The platform is operatively connected to a transverse shaft 12, the connections including a crank arm 13 on said shaft and a suitable linkage between said crank arm and the platform. The connections between the crank arm 13 and the platform 5 preferably comprise a link 14 pivoted to a bracket 15 at the front end of the platform and connected by another link 16 to the crank arm 13, and a radius arm 17 having a fixed pivot 18 on some part of the framing or other stationary part and also connected to the mutual pivot 19 of the links 14 and 16, the function of the arm 17 being to prevent the platform from tipping in consequence of a load on either end portion, i. e. portion projecting beyond the rollers 11. The motor 6 is connected by suitable gearing (indicated generally by the showing of the gear casings 20 and 21) to the shaft 12 whereby the platform 5 is raised by the movement of the crank 13 through half a revolution and is lowered during the movement of the crank through the remaining half revolution. A spring operated and electrically disengaged brake for the shaft of the motor 6 is indicated generally by the showing of the brake drum 34, the operating springs 36 for the brake elements and the solenoid 40 for disengaging the brake elements and which is energized while the motor 6 is in operation.

The operation of the motor 6 is controlled by a switch S, the operating parts of which are enclosed in and supported by a box 50 secured to any suitable stationary part of the truck or its framing. In the construction shown and preferred the switch includes a single arm 51 provided with pivoted spring held contacts 53 and 54 which severally co-operate with upper and lower stationary contacts 55 and 56, one pole of the motor 6 being connected to the arm 51 and the other pole being connected to the contacts 55 and 56. The arm 51 has an intermediate position in which neither of the stationary contacts 55 and 56 is engaged and the motor circuit is consequently interrupted. In its upper position the arm 51 closes the motor circuit through the contacts 53 and 55 and in its lower position said arm closes the motor circuit through the contacts 54 and 56. The switch is of the knife type and the pivotal spring held arrangement of the contacts 53 and 54 is provided in order that said contacts may be disengaged with a snap action from their companion stationary contacts, thereby to prevent or minimize arcing. It will be apparent that as the arm 51 is moved to its intermediate position from either of its extreme positions, the contact 53 or 54, as the case may be, will lag behind because of the friction of its engagement so that the tension of the coupling spring 57 is increased until said spring becomes sufficiently strong to quickly snap the movable contact from engagement with the companion stationary contact.

The switch is controlled manually by a pivoted handle 58 arranged at the rear of the truck and which is suitably connected to the arm 51. As shown and preferred, the switch operating mechanism includes an operating lever 59 mounted on a transverse rock shaft 60 suitably supported in parts of the framing and a link 61 connecting the lever 59 with the switch arm 51. The handle 58 is provided with an arm 62 projecting angularly from its pivot and which is connected by a link 63 with an upright arm 64 on the rock shaft 60. The handle 58 has a normal position corresponding to the intermediate position of the switch arm and is movable in either direction from such normal position, thereby to close the switch S and cause the operation of the motor. The arm 62 is preferably provided in one of its side faces with recesses 65 corresponding in arrangement to the several positions of the handle 58 and which co-operate with a spring pressed ball detent 69 (Figure 6) mounted in an adjacent stationary part, the detent 69 obviously serving to hold the handle 58 against accidental movement but presenting no obstruction to its ordered movement.

According to the invention the operation of the switch to open the circuit of the motor 6 is effected automatically and positively by the movement of the platform 5 in either direction, the opening of the motor circuit being timed to coincide substantially with the arrival of the platform in either of its raised or lowered positions. In the embodiment shown this is accomplished by providing the rock-shaft 60 with a downwardly projecting arm 70 to which movement is positively transmitted from the platform 5, whereby the shaft 60 is rocked to move the switch arm 51 to intermediate, i. e. open, position through the connections described. The arm 70 is provided at its lower end with a tappet 71 which is preferably adjustable and, under the conditions to be described, is engaged by the front end of the platform as the latter comes into its raised position. The arm 70 is also provided with a hook 72 which is pivoted to said arm as at 73 and, under the conditions to be described, acts as a connecting link between said arm and the pivot rod 19 included in the connections between the platform 5 and the crank arm 13.

When the switch arm 51 is in its normal intermediate, i. e. open, position the arm 70 is in a corresponding intermediate position and means is preferably provided for yieldably holding the connected switch arm 51 and arm 70, as well as the operating handle 58, in their normal intermediate positions. For this purpose it is preferred to employ a rod 74, slidable in a supporting bearing 75 and pivoted to the arm 64, and a pair of opposing springs 76 arranged at opposite sides of the bearing 75 against which they act, said springs also acting against collars 77 provided on said rod. It will be apparent that the springs 76 normally balance one another and that the movement of the rod 74 in either direction (and consequently the movements of the switch arm 51, arm 70 and handle 58, from their intermediate positions) is opposed by one or the other of the springs 76.

When the platform 5 is fully lowered, as shown in Figure 1, the switch arm 51 will be in open position and all parts connected to said switch arm will be in intermediate positions. To raise the platform the handle 58 is swung upward as shown in broken lines in Figure 1. Such movement of the handle 58 produces a downward movement of the switch arm 51, thereby closing the motor circuit through the contacts 54 and 56, as shown by broken lines in Figure 2, and also produces a forward movement of the arm 70 to the position shown by broken lines in Figure 1. The platform 5 is now elevated by its operating mechanism, as actuated by the motor 6, to the position shown in Figure 3. As said platform comes to its fully elevated position, its front end strikes the tappet 71 of the forwardly set arm 70 and the platform during the remainder of its travel (which is prescribed by the bearing surfaces 10), moves the arm 70 to its intermediate position, thereby, through the rock shaft 60 and the connections described, moving the switch arm 51 to its intermediate open position and also moving all other parts to their intermediate positions, all as shown in Figure 3. To lower the platform the handle 58 is swung downward as shown in broken lines in Figure 3. Such movement of the handle 58 produces an upward movement of the switch arm 51, thereby closing the motor circuit through the contacts 53 and 55, as shown by broken lines in Figure 4, and also produces a rearward movement of the arm 70 to the position shown by broken lines in Figure 3. The platform 5 is now lowered by its operating mechanism, as actuated by the motor 6, to the position shown in Figure 1. As said platform descends the pivot rod 19 strikes the hook 73, ultimately engaging the bill of said hook, and as the platform comes into its lowered position, the hook 73 acts as a connecting link between the platform and the arm 70 whereby, in the final stage of the downward movement of the platform, the arm 70 is pulled from its rearward position to its intermediate position and moves the switch arm 51 to its intermediate open position, at the same time re-setting all the connected parts in their intermediate positions, all as shown in Figure 1.

It will thus be apparent that the movement of the switch arm 51 to its open position is transmitted positively from the platform and the switch will in any case, therefore, be opened by the platform as the latter completes its upward or downward movement.

Having fully described my invention, I claim:

1. In an industrial truck of the type having a lifting platform, a supporting frame therefor, operating means for said platform, and an electric motor for actuating said operating means and a switch controlling the circuit of said motor, automatic control mechanism for said switch including a rockably mounted actuating arm located behind the rear end of said platform and above said supporting frame and provided with a tappet for engagement directly by said platform at its rear end at a period of its movement in one direction and also with a hook co-operative with said operating means to function as a link connection to the same during a period of the movement of said platform in the opposite direction, said actuating arm being thereby operated by said platform and operating means to open said switch.

2. In an industrial truck of the type having a lifting platform, an electric motor and a switch controlling the circuit of said motor, the combination of an operating crank arm actuated by said motor, links connecting said crank arm and said platform and having a mutual pivot bar, a radius arm connected to the mutual pivot bar of the links, a rockably mounted actuating arm for said switch having a tappet for engagement by said platform at a period of its movement in one direction and a hook for engagement by said pivot bar and operative as a link connection to said platform during a period of its movement in the opposite direction, said actuating arm being thereby operated by said platform to open said switch.

3. In an industrial truck of the type having a lifting platform, operating means therefor, an electric motor for actuating said operating means and a switch controlling the circuit of said motor, automatic control mechanism for said switch including a part located behind the rear end of said platform and directly engaged by the same as the platform comes into its raised position whereby to open said switch, and an element also located behind the rear end of said platform and by co-operation with said operating means functioning automatically as a link to operate said part to open the switch as the platform comes into its lowered position.

In testimony whereof I affix my signature.

WILLIAM C. CARR.